United States Patent
Itoh et al.

(10) Patent No.: US 6,910,683 B2
(45) Date of Patent: Jun. 28, 2005

(54) FLUID-SEALED ANTI-VIBRATION DEVICE

(75) Inventors: Masaaki Itoh, Nishiku (JP); Shingo Hatakeyama, Osaka (JP); Yukio Takashima, Osaka (JP); Takeshi Hamanaka, Ebina (JP)

(73) Assignees: Toyo Tire & Rubber Co., Ltd., Osaka (JP); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/449,431

(22) Filed: May 29, 2003

(65) Prior Publication Data

US 2004/0239021 A1 Dec. 2, 2004

(51) Int. Cl.[7] .............................................. F16M 13/00
(52) U.S. Cl. .................... 267/140.13; 267/219
(58) Field of Search .................. 267/140.11, 140.13, 267/140.14, 219

(56) References Cited

U.S. PATENT DOCUMENTS

| | | | | | |
|---|---|---|---|---|---|
| 4,647,023 | A | * | 3/1987 | Ray et al. ................... | 267/219 |
| 4,742,999 | A | * | 5/1988 | Flower ................... | 267/140.13 |
| 4,815,720 | A | * | 3/1989 | Vanessi ................... | 267/140.13 |
| 4,974,818 | A | * | 12/1990 | Kato ................... | 267/140.13 |
| 5,443,245 | A | * | 8/1995 | Bellamy et al. ........ | 267/140.13 |
| 6,523,813 | B1 | * | 2/2003 | Kato ................... | 267/140.11 |
| 6,685,175 | B2 | * | 2/2004 | Takashima et al. ..... | 267/140.13 |
| 2002/0047080 | A1 | * | 4/2002 | Guillemot ................... | 248/562 |
| 2004/0084819 | A1 | * | 5/2004 | Okada et al. .......... | 267/140.13 |

FOREIGN PATENT DOCUMENTS

FR          2674590          10/1992

* cited by examiner

Primary Examiner—Robert A. Siconolfi
Assistant Examiner—Bradley King
(74) Attorney, Agent, or Firm—Jordan and Hamburg LLP

(57) ABSTRACT

In an anti-vibration device having a partition member dividing a fluid-sealed chamber into upside and downside, aimed at enhancing the anti-vibration performance by preventing unwanted leak of the fluid through through-holes of the partition member. To that end, the partition member is constructed of an elastic membrane partitioning the fluid-sealed chamber, and a pair of grids limiting displacements of the elastic membrane; and the elastic membrane is provided at its either surface with projecting streaks integral therewith, the projecting streaks surrounding through-holes, defined by the grids, over their whole peripheries and abutting on the grids, thereby regulating the flow of fluid among adjacent through-holes.

15 Claims, 13 Drawing Sheets

FLUID-SEALED ANTI-VIBRATION DEVICE

BACKGROUND OF THE INVENTION

1. Field of the Invention

This invention relates to a fluid-sealed anti-vibration device principally for use in an automotive engine or any other vibratory body in a vibration-proof manner.

2. Description of Related Art

A typical fluid-sealed anti-vibration device is constructed so that a first fitting to be mounted on a vibration-generator side such as an engine and a second fitting of a cylindrical form to be mounted and secured to a support side such as a vehicle frame, etc. are connected through a vibration-insulating base made of a rubber material, a diaphragm is disposed to oppose the vibration-insulating base at a lower side of the second fitting, an internal room between the vibration-insulating base and the diaphragm is made into a fluid-sealed chamber, which is in turn divided by a partition member into two chambers at the vibration-insulating base side and at the diaphragm side, both chambers being put into communication with each other through an orifice, whereby a vibration-damping function is performed owing to a liquid fluidization effect between both liquid chambers through the orifice and a vibration-insulating effect of the vibration-insulating base.

Of fluid-sealed anti-vibration devices of this type, such a device is known in the art that has a partition member constructed of an elastic membrane, as a valve member, reciprocating to displace and a pair of upper and lower grids limiting the movement of the elastic membrane. With the anti-vibration device having the elastic membrane like this, under low frequency and large amplitude vibrations such as a vibration ascribed to irregularities on the road surface when the vehicle is traveling, the fluid flows through the orifice to fluidize between the two chambers, as a result of which the device serves to exhibit a vibration-damping function. On the other hand, under high frequency and slight amplitude vibrations such as a vibration ascribed to revolution number of the engine, the above-mentioned orifice does not work, but the elastic membrane reciprocates to deform thereby exhibiting a vibration-damping function.

FR Patent Publication No. 2674590 A discloses a one wherein a partition member partitioning an upper and a lower liquid chambers is made up of a pair of upper and lower grids and an elastic membrane held between the grids. According to the patent publication, the elastic membrane is provided so that its central part may be sandwiched and held between the upper and lower grids and its peripheral portion may float, the elastic membrane being provided at least one surface thereof with bosses or protuberances opposing the grids in order to prevent the generation of impinging sound of the membrane on the grids and unwanted noise. These bosses are arranged on the surface of the elastic membrane so as to be juxtaposed equally in a ring fashion and have the function that they are pressed stepwise toward the grid and then elastically relax when the elastic membrane works.

U.S. Pat. No. 5,443,245 discloses another one, wherein the partition member comparting the upper and lower chambers is constructed of a pair of upper and lower orifice members having a grid at each central part and forming an orifice channel at each peripheral part, and an elastic membrane held between both orifice members. It further discloses the technology that with a view to preventing the generation of impinging sound of the elastic membrane on the grids and unwanted noise, the grid, not the elastic membrane, is provided with angularly adjacent, but non-repetitive non-uniform ribs wholly around the axis line.

The bosses or the ribs in the prior art technology mentioned above are thus provided to diminish the shock sound when the elastic membrane is displaced up and down to impinge on the grids, but not to limit the transfer of the sealed liquid in a circumferential direction and a radial direction among through-holes formed by the grids. In the conventional devices, therefore, transfer or leak of the sealed liquid among contiguous through-holes of the grids occurs under low frequency and large amplitude vibrations, with the result that it would be difficult to exhibit higher performance.

Again the conventional vibration-proof devices above can diminish the impinging sound or noise by means of the bosses or ribs in a sense, but the peripheral part of the elastic membrane is not restrained at all, which causes the peripheral part of the elastic membrane to flap due to a rapid change in hydraulic pressure. Hence it would be difficult to prevent necessarily sufficiently the generation of impinging sound and noise. In addition, these devices are inferior in assembling workability, as well: For instance, in assembling the partition member, the peripheral portion of the elastic membrane is liable to turn up; or when the elastic membrane will be inserted between the grids, a flat shape of the elastic membrane makes it difficult to insert.

With the above-mentioned anti-vibration device disclosed in U.S. Pat. No. 5,443,245, the orifice members of a same material are fitted in the elastic membrane thus configuring the orifice flow channel and a movable clearance of the elastic membrane. In that case, the only way to enhance the fitting precision was either to machine (cut) the fitting surface or to make a sacrifice of the dimensional precision in movable clearance of the elastic membrane. That is, the clearance dimension of the upper and lower orifice members when assembled is set by setting respective dimensions of them to be fitted and consequently, in particular where components with a large fabrication tolerance are assembled together, it was not easy to ensure the dimensional precision of the movable clearance.

SUMMARY OF THE INVENTION

A primary object of this invention is to enhance anti-vibration performance by preventing unwanted leak of the sealed fluid among through-holes of the partition member.

Another object of this invention is to prevent the flapping of the peripheral part of the elastic membrane of the partition member and to enhance the assembling workability.

A further object of the invention is to enhance the dimensional precision of the movable clearance for the elastic membrane of the partition member.

A fluid-sealed anti-vibration device according to a first embodiment of this invention comprises a first attachment member; a second attachment member; a vibration-insulating base made of a rubber material interposed between both attachment members to connect them; a diaphragm attached to the second attachment member to oppose the vibration-insulating base; a fluid-sealed chamber provided between the vibration-insulating base and the diaphragm; a partition member dividing the liquid-sealed chamber into a first chamber at the vibration-insulating base side and a second chamber at the diaphragm side; and an orifice channel putting the first chamber and the second chamber into communication with each other, wherein the partition member includes an elastic membrane partitioning the first chamber and the second chamber, a pair of grids limiting displacements of the elastic membrane, and projecting streaks in the form of a framework structure provided between either surface of the elastic membrane and one surface of each of the grids opposing the either surface, the projecting streaks surrounding respective through-holes defined by the grids over whole peripheries of the through-holes and regulating the transfer of fluid among contiguous through-holes of the grids.

By the provision of the aforesaid projecting streaks surrounding whole peripheries of the through-holes of the grids between the elastic membrane and the grids opposing it, the projecting streaks serve to prevent leak of the fluid among contiguous through-holes, in particular, under low frequency and large amplitude vibrations. As a consequence, it is possible to flex the elastic membrane to every through-hole, and a high loss factor is attainable. Under high frequency and slight amplitude vibrations, it may also be possible to construct so that the fluid can flow beyond the projecting streaks. Then the fluid flowing beyond the projecting streaks mollifies the hydraulic pressure difference, exhibiting a low dynamic spring constant. According to the first embodiment, it follows from the above that it is possible to enhance the anti-vibration performance.

In the first embodiment stated above, the projecting streaks can be formed integrally either with each surface of the elastic membrane or with one surface of each of the grids vis-a-vis the former. More particularly, the grids each consist of a plurality of annular portions extending circumferentially and joint portions radially extending to interconnect the plurality of annular portions, thus constituting two or more through-hole rows, each consisting of a plurality of through-holes circumferentially juxtaposed. Here, in one embodiment, the joint portions of each grid are arranged in different pitches between the inner periphery side and outer periphery side of the grid; and the projecting streaks are provided on the elastic membrane and consist of a plurality of annular projecting pieces extending circumferentially correspondingly to the annular portions of the grid and a plurality of radial projecting pieces extending radially correspondingly to the joint portions of the grid, the radial projecting pieces extending in a nearly whole radial length of the elastic membrane and in a radial manner at intervals of an equal angle. In that case, some of the radial projecting pieces do not rest on the joint portions of the grid. Nevertheless such projecting streaks out on the grid hinder by no means the flexing behavior of the elastic membrane to every through-hole. Therefore even such projecting streaks that are equally arranged around an axis line of the elastic membrane do not affect that function.

In the first embodiment above, in case where the projecting streaks are provided integrally on the elastic membrane, the positioning of the elastic membrane in its revolution direction may be carried out by providing the elastic membrane with a positioning lug (projection) while providing the grid with a positioning recessed portion such that the lug can be fitted therein, and fitting both together. By this means it is possible to rest the radial projecting pieces provided on the elastic membrane securely on the joint portions of the grid.

A fluid-sealed anti-vibration device with which a second embodiment of this invention is concerned comprises a first attachment member; a second attachment member; a vibration-insulating base made of a rubber material interposed between these attachment members to connect them; a diaphragm opposing the vibration-insulating base and attached to the second attachment member; a fluid-sealed chamber provided between the vibration-insulating base and the diaphragm; a partition member dividing the fluid-sealed chamber into a first chamber at the vibration-insulating base side and a second chamber at the diaphragm side; and an orifice putting the first chamber and the second chamber into communication with each other, wherein the partition member comprises an elastic membrane partitioning the first chamber and the second chamber; a first member including a first grid disposed to face the one surface of the elastic membrane and limiting displacement of the elastic membrane and a first vertical wall extending from a peripheral portion of the first grid to surround an outer periphery of the elastic membrane; and a second member including a second grid disposed to face the other surface of the elastic membrane and limiting displacement of the elastic membrane and a second vertical wall extending from a peripheral portion of the second grid and disposed to face an inner peripheral side of the first vertical wall; the elastic membrane being provided with a vertical wall section that extends from a peripheral portion of the elastic membrane and is inserted in a gap between the first vertical wall and the second vertical wall.

In the second embodiment above, due to the vertical wall section provided at the peripheral portion of the elastic membrane, the peripheral portion of the elastic membrane is hindered from flapping owing to a rapid change in hydraulic pressure. As a consequence, it is possible to preclude the generation of impinging sound of the elastic membrane on the grids and unwanted noise. Further due to the vertical wall section of the elastic membrane, identification of the elastic membrane between its surface side and back side becomes easy, inserting operation of the elastic membrane into the first member is facilitated, and besides, turning-up at the peripheral portion of the elastic membrane can be avoided. Thus the assembling workability of the partition member is enhanced.

It is preferred to apply the construction of the first embodiment described above to this second embodiment. That is, in the second embodiment it is preferred to provide projecting streaks, in the form of a framework structure, between either surface of the elastic membrane and each one surface of the first and second grids opposing the former, the projecting streaks surrounding respective through-holes defined by the grids around whole peripheries thereof and regulating flow of the fluid among adjacent through-holes of the grids.

A fluid-sealed anti-vibration device according to a third embodiment comprises a first attachment member; a second attachment member; a vibration-insulating base made of a rubber material interposed between these attachment members to connect them; a diaphragm opposing the vibration-insulating base and attached to the second attachment member; a fluid-sealed chamber provided between the vibration-insulating base and the diaphragm; a partition member dividing the fluid-sealed chamber into a first chamber at the vibration-insulating base side and a second chamber at the diaphragm side; and an orifice channel putting the first chamber and the second chamber into communication with each other, wherein the partition member comprises an elastic membrane partitioning the first chamber and the second chamber; a first member disposed at the vibration-insulating base side relative to the elastic membrane; and a second member disposed at the diaphragm side relative to the elastic membrane and having a peripheral portion crimped to the second attachment member thereby urging a peripheral portion of the first member toward a peripheral portion of the vibration-insulating base at the fluid-sealed chamber side, one of the first member and the second member being provided with a depressed part for receiving the elastic membrane and the other being provided with a flat plane part abutting on an edge surface of an opening of the depressed part so as to shut off the opening of the depressed part, the first member and the second member forming therebetween a clearance limiting displacements of the elastic membrane.

In accordance with this third embodiment, in the partition member forming an orifice channel at its outer periphery, the dimension of the movable clearance for the elastic membrane is defined depending upon the depth of the depressed part provided either on the first member or on the second member. That is to say, it is possible to set that dimension for regulating displacements of the elastic membrane only at one side of either the first member or the second member. As a consequence, it is possible to enhance the dimensional precision of the movable clearance as compared to the case where dimensional setting is performed by a combination of the both. With the recent request for higher performance of vehicles, wherein a high dimensional precision is also required for the movable clearance of the elastic membrane, the third embodiment can meet this request by such a simple combination at a low cost.

In the third embodiment, the first member and the second member can be made of dissimilar materials, wherein one member smaller in fabrication tolerance is provided with the aforesaid depressed part whereby it is possible to set the movable clearance by only one member of a good precision. For example, the first member may be provided with the depressed part and fashioned of a resin whereas the second member may be provided with the flat plane part and fashioned of a metal. Here as regards the second member to be secured by crimping, it is fashioned of a metal such as a pressed steel sheet or aluminum casting whereby it is possible to ensure such a strength that withstands the crimping. On the other hand, as regards the first member on which dimensional setting of the movable clearance is made, it is fashioned of a resin having a good dimensional precision, whereby it is possible to ensure a dimensional precision of the movable clearance without applying a cutting processing. Further a weight reduction can also be achieved by use of the resin.

Preferably the third embodiment is constituted so that the first member and the second member basically may not contact with each other in other areas than the abutting area of the flat plane part and the opening edge surface of the depressed part. However, for the purpose of positioning both members in the revolution direction, it doesn't matter that both are partly in contact in the other areas. For example, in cases where the first member is provided at its outer peripheral area with a vertical wall shutting off the flow in the orifice channel in the circumferential direction, it is possible to elongate a tip end of the vertical wall and to insert the elongated or extension portion in a hole apertured in the peripheral portion of the second member. Here, when the extension portion is applied on the opening margin of the hole, the positioning of the first member and the second member in the revolution direction can be performed. Furthermore since the vertical wall here is extended up to the second member side, the extension portion can avoid unwanted leak of fluid from between the tip end of the vertical wall and the second member. Otherwise the extension portion of the vertical wall may be formed with a hook, which is caught in the opening margin of the hole, whereby upon fabrication the first member and the second member are prevented from disengaging and revolving.

It is also possible to apply the construction of the first embodiment stated above to the third embodiment. In that case, the first member is disposed to face the one surface of the elastic membrane and provided with the first grid limiting the displacement of the elastic membrane; the second member is disposed to face the other surface of the elastic membrane and provided with the second grid limiting the displacement of the elastic membrane; between both surfaces of the elastic membrane and respective surfaces of the first grid and the second grid there are provided projecting streaks, in the form of a framework structure, surrounding through-holes defined by the grids over whole peripheries thereof and regulating the transfer or flow of fluid among adjacent through-holes of the grids.

DESCRIPTION OF THE PREFERRED EMBODIMENTS

Figure 1:
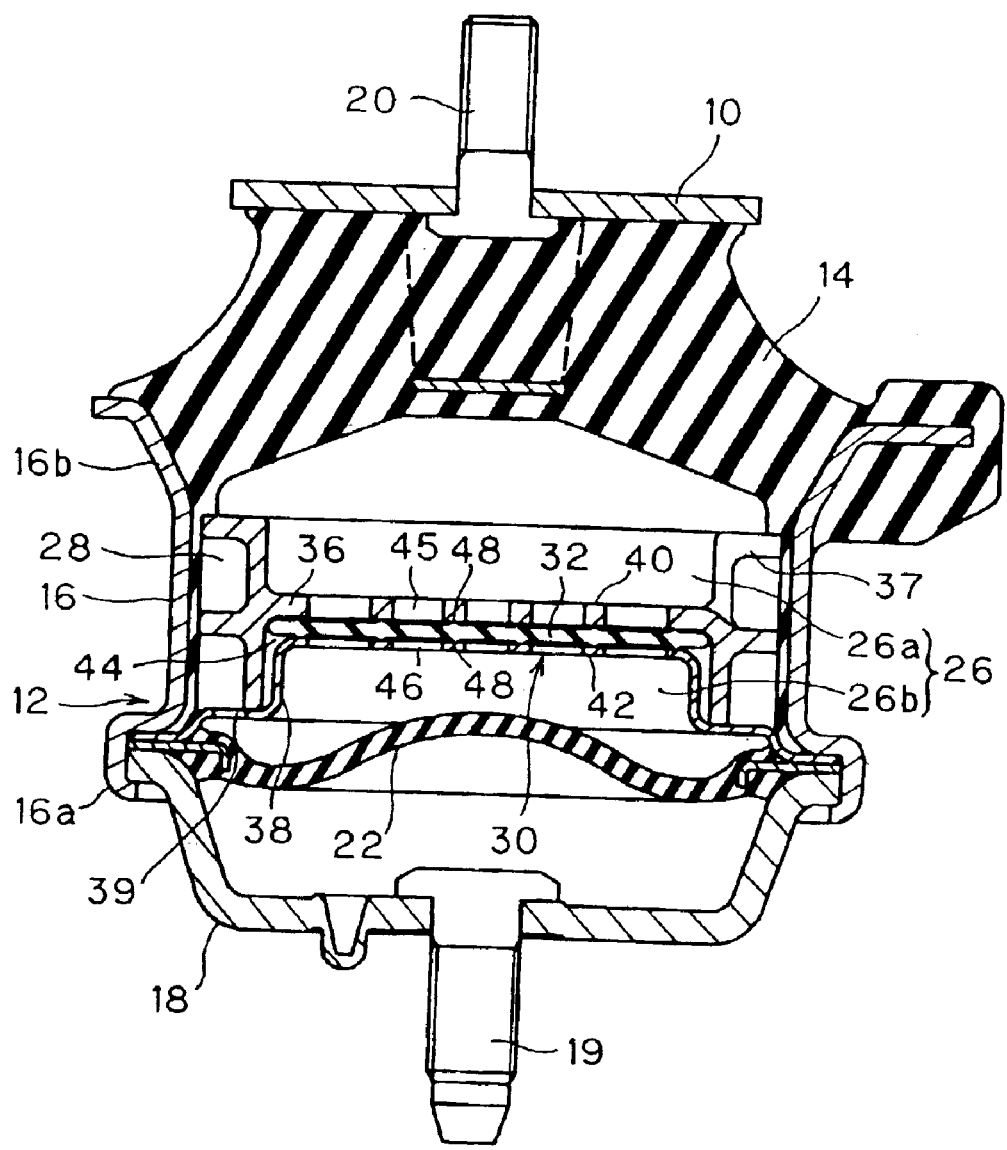
FIG. 1 is a longitudinal sectional view of an anti-vibration device pertaining to a first example of this invention.
Figure 2:
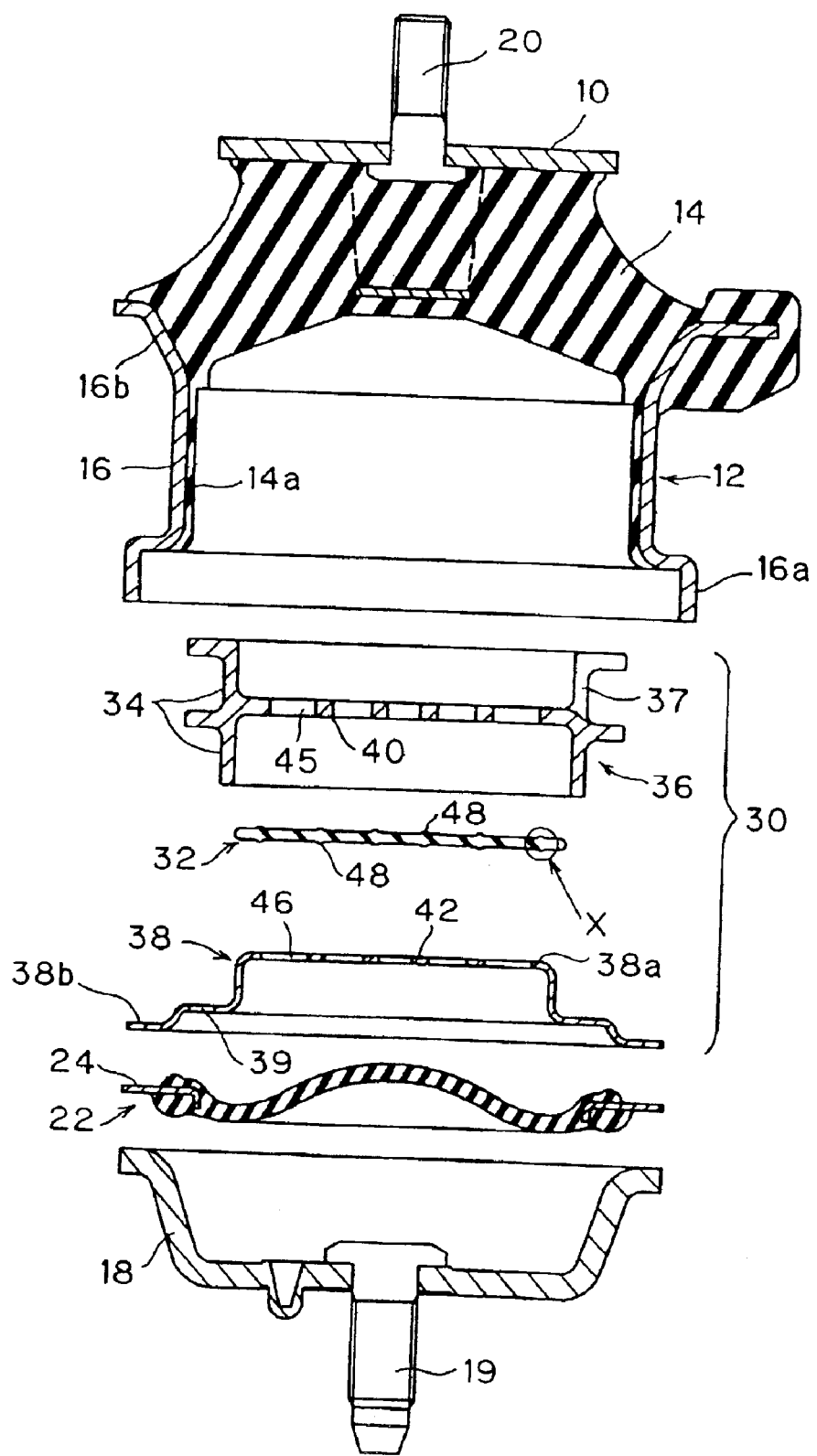
FIG. 2 is a sectional view illustrating the same device in an exploded state.

The anti-vibration device relating to examples of this invention will be hereinafter described in more detail with reference to the accompanying drawings.

FIRST EXAMPLE

FIGS. 1 to 4 indicate a first example of this invention. The anti-vibration device in the first example comprises a first attachment member 10 to be mounted on a vibration-generator side such as engine, a second attachment member 12 made of metal having a cylindrical drum body to be mounted and secured to a support side such as a vehicle frame, etc., and a vibration-insulating base 14 made of rubber material interconnecting the both.

The second attachment member 12 is composed of a generally cylindrical fitting 16 constituting the aforementioned cylindrical drum body, and a bottom fitting 18 fastened to the fitting 16 at its lower end portion 16*a* by crimping means, the bottom fitting 18 having a bolt 19 for mounting provided projectingly.

The vibration-insulating base 14 assumes a nearly truncated cone shape in outline, and its topside is secured to the first attachment member 10 by vulcanization molding means whereas its lower and outer peripheral portion is secured to an upper end portion of the second attachment portion 12 by vulcanization molding means. In the illustrated example, the upper end portion 16*b* of the cylindrical fitting 16 is configured to flare in a taper form by upsetting, and the lower outer periphery of the vibration-insulating base 14 is bonded to the upper end portion 16*b* by vulcanization. On an inner wall surface of the second attachment member 12 there is provided a thin film rubber portion 14*a* extended from the vibration-insulating base 14.

At a lower side of the second attachment member 12, a diaphragm 22 made of a rubber membrane is fitted so as to oppose the vibration-insulating base 14. The diaphragm 22 is provided at its outer peripheral area with a ring-like reinforcing fitting 24, which is crimped and secured to a crimped area of the cylindrical fitting 16 and the bottom fitting 18, whereby the diaphragm 22 is attached to the second attachment member 12.

The second attachment member 12 internally forms a fluid-sealed chamber 26 enclosed between the diaphragm 22 and the vibration-insulating base 14. To an inner periphery of the second attachment member 12 at the fluid-sealed chamber 26 side, a disc-form partition member 30 having an orifice channel 28 is fitted liquid-tightly. The fluid-sealed chamber 26 is divided through the partition member 30 into a first chamber 26*a* at the vibration-insulating base side and a second chamber 26*b* at the diaphragm side, both chambers 26*a*, 26*b* being put into communication with each other via the orifice channel 28.

The partition member 30 is constructed of a disk-like rubber membrane 32 as a valve member partitioning the first chamber 26*a* and the second chamber 26*b*, an upper member 36 disposed at the vibration-insulating base 14 side relative to the rubber membrane 32 and having a groove 34 constituting the orifice channel 28, and a lower member 38 disposed at the diaphragm side relative to the rubber membrane 32 and urging an outer peripheral part of the upper member 36 to the vibration-insulating base 14 side.

The upper member 36 is of a molding body made of metal or resin and formed on its outer peripheral surface by the groove 34 extending circumferentially in a vertically two-cycle manner. A space enclosed by this groove 34 and the thin film portion 14*a* of the vibration-insulating base 14 is made into the orifice channel 28.

The lower member 38 is of a press molding body from a metal sheet and has a central disk-shaped shelf part 38*a* protruding upwardly. The lower member 38 is fitted to the second attachment member 12, with its outer peripheral portion 38*b* crimped and secured to the crimped area of the cylindrical fitting 16 and the bottom fitting 18.

The upper member 36 and the lower member 38 are defined with openings 37, 39 for bringing the orifice channel 28 into communication with the first chamber 26*a* and the second chamber 26*b*, respectively.

The upper member 36 and the lower member 38 are formed at their central areas by grids 40, 42, respectively, of a circular form in outline limiting displacements of the rubber membrane 32 in the vertical direction. The rubber membrane 32 is disposed within a gap (a space for housing) 44 formed between the grid 40 of the upper member 36 facing the first chamber 26*a* and the grid 42 of the lower member 38 facing the second chamber 26*b* to the extent that its displacement is restricted between both grids 40, 42. The dimension or height of the gap 44 is set to be somewhat larger than the thickness of the rubber membrane 32, whereby making the rubber membrane 32 possible to displace and move up and down.

Figure 4A:
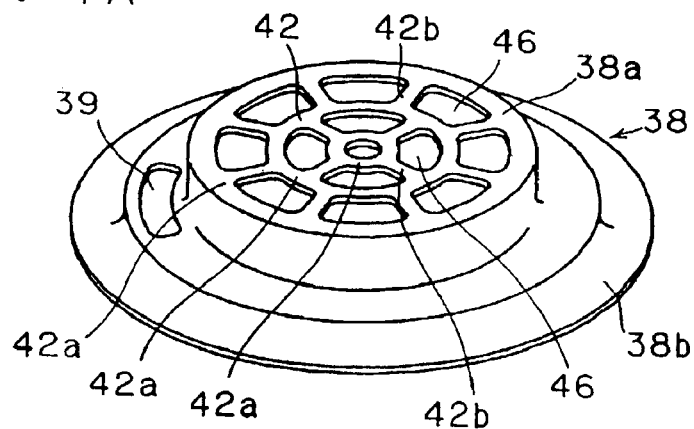
FIG. 4A is a perspective view of a lower member in that example, FIG. 4B a perspective view of a rubber membrane, and FIG. 4C a plan view of a combination of the lower member and the rubber membrane.
Figure 4B:
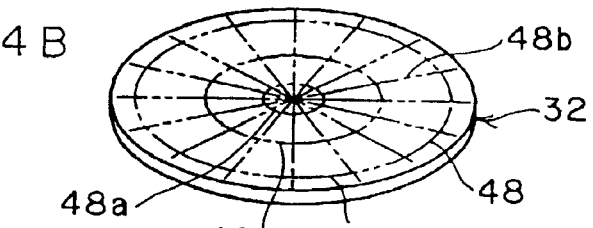
Figure 4C:
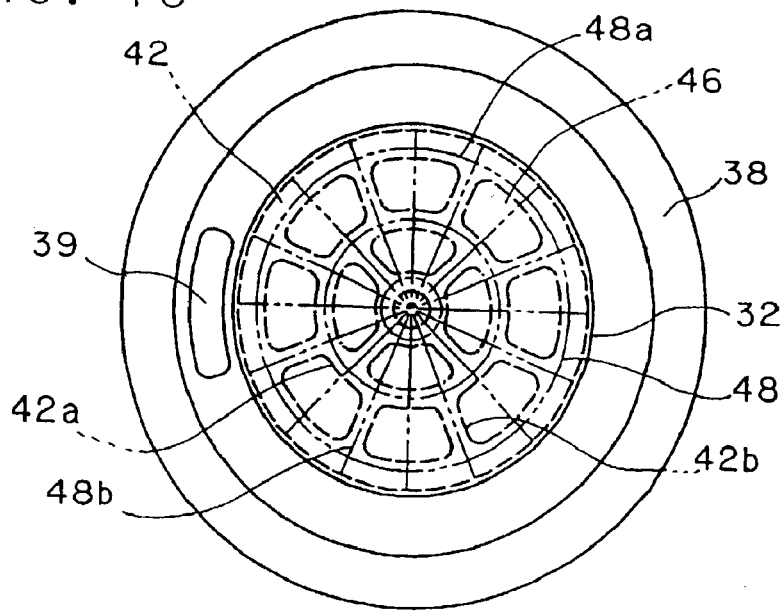

Both grids 40, 42 have one grid configuration. More particularly, the grid 42 formed on the central shelf part 38*a* of the lower member 38, as illustrated in FIGS. 4A and 4C, comprises three concentric annular portions 42*a* extending circumferentially and joint portions 42*b* extending radially to interconnect adjacent two annular portions. The joint portions 42*b* are arranged in different pitches between the inner periphery side and the outer periphery side of the grid 42. In the illustrated example, four joint portions 42*b* at the inner periphery side are arranged at intervals of 90 degrees and eight joint portions 42*b* at the outer periphery side are arranged at intervals of 45 degrees. Besides the inner and outer joint portions 42*b* are arranged out of phase by 22.5 degrees so that both may not be in phase (both are not in line). By this arrangement of the grid 42, two through-hole rows are provided at the inner periphery side and the outer periphery side of the grid, in each of which a plurality of elongate through-holes 46 are juxtaposed circumferentially. Here, four through-holes 46 at the inner periphery side and eight through-holes 46 at the outer periphery side can be provided by varying the pitch of the joint portions 42*b* as stated above. The number of the through-holes 46 is made smaller at the inner periphery side in this way, which enables it to ensure the opening area of each through-hole 46 at the inner periphery side as large as that at the outer periphery side. The grid 40 of the upper member 36 also has the same configuration as that of the grid 42 of the lower member 38. The upper member 36 is provided with through-holes 45 in the same configuration and arrangement as that of the through-holes 46 of the lower member 38, accordingly. These upper member 36 and lower members 38 thus constructed are assembled so that respective through-holes 45, 46 may be arranged in register with one another.

Figure 3:
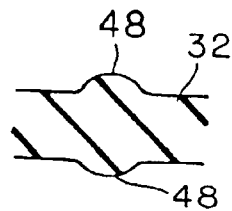
FIG. 3 is an enlarged view of FIG. 2 in the circumscribing part X.

The rubber membrane 32 is formed, on either surface thereof, integrally with projecting streaks 48 that abut on each of surfaces of the grids 40, 42 facing either surface of the rubber membrane to surround respective through-holes 45, 46 over whole outer peripheries thereof. As shown in FIG. 3, the projecting streaks 48 are provided in the same shape and structure on both upper and lower surfaces of the rubber membrane 32. More particularly, the projecting streaks 48 include, in the illustrated example of FIG. 4B, three concentric annular projecting pieces 48*a* extending circumferentially correspondingly to the annular portions 42*a* of the grid 42 and radial projecting pieces 48*b* extending radially correspondingly to the joint portions 42*b* of the grid 42. The radial projecting pieces 48*b* extend from a center of the rubber membrane 32 over a whole radial length thereof. Further the radial projecting pieces 48*b* are provided at intervals of 22.5 degree so as to rest on all of the joint portions 42*b* of the grid 42 and to extend radially at an equal angle.

According to the anti-vibration device thus constructed in the first example, under low frequency and large amplitude (e.g., ±0.3 mm or more) vibrations the fluid flows through the orifice channel 28 between two chambers 26a, 26b thereby exhibiting a vibration-damping function. Due to the projecting streaks 48 formed on the rubber membrane 32 serving to abut on bearing surfaces of the grid 40, 42 the projecting steaks oppose, leaking of the fluid among circumferentially or radially adjacent through-holes 45, 46 is prevented. Consequently it is possible to flex the rubber membrane 32 at every one of the through-holes 45, 46, as a result of which a high loss factor is obtainable. On the other hand, under high frequency and slight amplitude (e.g., ±0.1 mm or less) vibrations, the orifice channel 28 does not work, but a hydraulic difference between the first chamber 26a and the second chamber 26b is mollified by the fluid flowing beyond the projecting streaks 48 thereby to exhibit a low dynamic spring constant. To summarize, the anti-vibration device according to the first example therefore can achieve a high loss factor and a low dynamic spring constant while eliminating the amplitude dependency, so that it is possible to exhibit enough performance at different amplitudes.

As an aside, of the radial projecting pieces 48b arranged equally about the axis line, some don't rest on the joint portions of the grids 40, 42 owing to the arrangement way of the grids 40, 42 wherein the arrangement pitch of the joint portions is varied between the inner periphery side and the outer periphery side. Even such projecting streaks 48 that are out on the grids 40, 42, however, never obstruct the flexing behavior of the rubber membrane 32 to every one of the through-holes 45, 46, and accordingly, never impair the above-mentioned performance.

In this example, the embodiment wherein the projecting streaks 48 are integrally formed on the rubber membrane 32 has been so far described. Alternatively, the projecting streaks 48 may also be formed integrally with the grids 40, 42. In that case, the projecting streaks 48 formed on the grids 40, 42 serve to abut on the rubber membrane 32, whereby leak of fluid among adjacent through-holes 45, 46 is prevented.

SECOND EXAMPLE

Figure 5A:
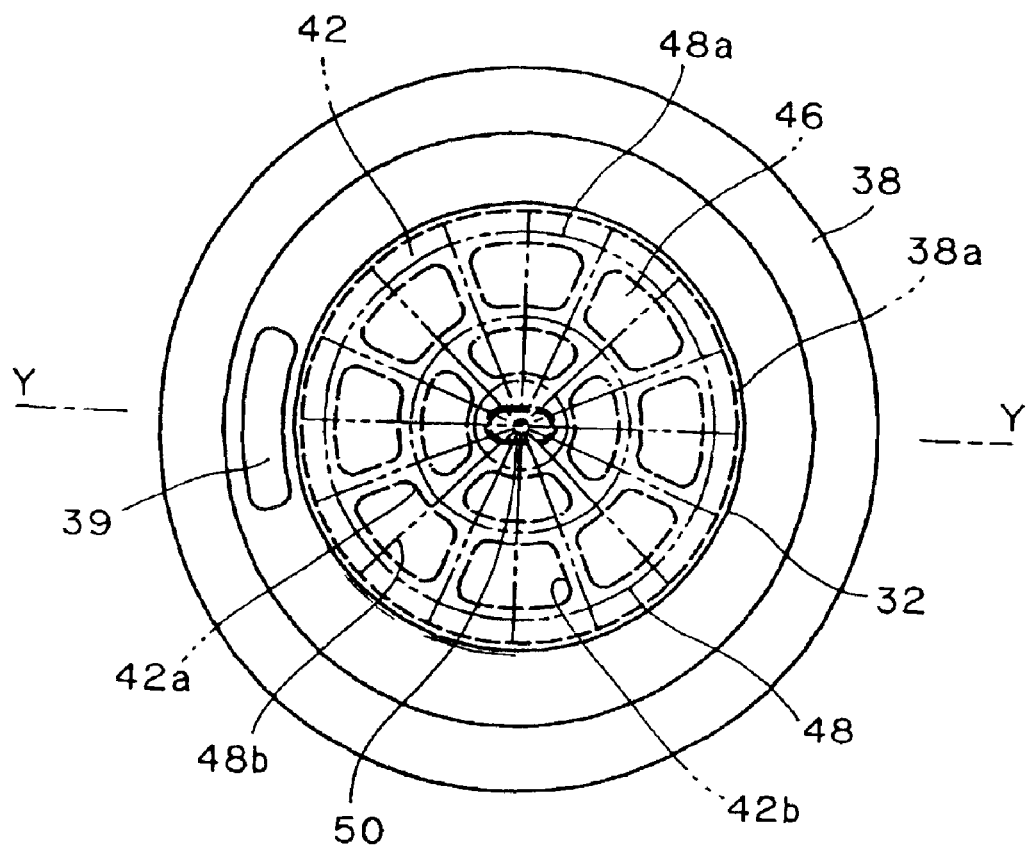
FIG. 5A is a plan view showing a combination of the lower member and the rubber membrane according to a second example, and FIG. 5B a sectional view taken along Y—Y line in FIG. 5A.
Figure 5B:
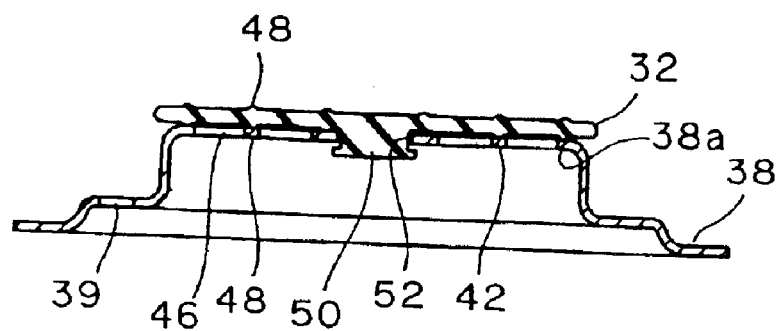

The second example is, as shown in FIGS. 5A and 5B, such an example that a positioning construction of the rubber membrane 32 in the revolution direction is added to the first example above. That is, in this second example, the rubber membrane 32 is provided with an ellipsoidal lug (projection) 50 for positioning that project at the lower member 38 side. The lug 50 is situated in the center of the rubber membrane 32. The lower member 38 is provided, in the center of the central shelf part 38a, with a recess 52 for positioning and receiving the lug 50 therein. The recess 52 is of a complementary elongate hole conforming to the contoured form of the lug 50.

According to this second example, in assembling the rubber membrane 32 onto the lower member 38, the rubber membrane 32 is rested on the grid 42 of the lower member 38 while the lug 50 of the rubber membrane 38 is fitted in the recess 52 of the lower member, whereby it is possible to ride securely the radial projecting pieces 48b formed on the rubber membrane 32 on the joint portions 42b of the grid 42.

The shapes of the lug 50 and the recess 52 are not limited to the ellipsoidal shape as mentioned above if only positioning of both in the revolution direction is possible, but various shapes such as polygonal shape can be adopted. Otherwise the positioning may also be effected by providing and fitting two sets of positioning lugs and recesses.

THIRD EXAMPLE

FIGS. 6 to 9 indicate a third example of this invention. The third example is similar to the first example except for the construction of the partition member comparting the fluid-sealed chamber 26. The similar elements designated by like reference numerals in the first example have the same construction, and their detailed explanation will be hereinafter omitted unless otherwise stated.

In the third example, the partition member 100 comparting the fluid-sealed chamber 26 is made up of a disk-like rubber membrane 102 as a valve member partitioning the first chamber 26a and the second chamber 26b, an upper member (a first member) 106 having a groove 104 for forming the orifice channel 28 at its outer periphery, and a lower member (second member) 108 pressing the outer peripheral portion of the upper member 106 toward the vibration-insulating base 14 side.

The upper member 106 is fashioned of a molding body made of metal or resin, and includes a grid (the first grid) 110 disposed to oppose the top surface of the rubber membrane 102, and a vertical wall (the first vertical wall) 112 extended from the peripheral portion thereof to surround the outer periphery of the rubber membrane 102. More particularly, the upper member 106 includes a cylindrical vertical wall 112 and the circular grid 110 spanning the interior of the vertical wall in a manner dividing it vertically in the axially central area. On the outer peripheral surface of the vertical wall 112 the groove 104 is formed to extend circumferentially and over vertically two cycles.

The lower member 108 is of a press molding body of a metal sheet, and includes a grid (second grid) 114 disposed to oppose the lower surface of the rubber membrane 102, and a vertical wall (second vertical wall) 116 disposed to oppose the inner periphery side of the vertical wall 112 of the upper member 106. More specifically, the lower member 108 is made up of a grid 114 having a central shelf part of a circular form projecting upwardly, a cylindrical vertical wall 116 extending downwardly from the periphery of the grid 114, and an outer peripheral portion 118 extending from the lower end of the vertical wall 116 radially outwardly. The lower member 108 is attached to the second member 12, with the outer peripheral portion 118 crimped and secured to the crimped area of the cylindrical fitting 16 and the bottom fitting 18.

The rubber membrane 102 is disposed in a gap 120 defined between the grid 110 of the upper member 106 and the grid 114 of the lower member 108, and its vertical displacements are limited between both grids 110, 114. The height of the gap 120 is set to be somewhat greater than the thickness of the rubber membrane 102 thereby enabling the rubber membrane 102 to displace up and down.

Figure 6:
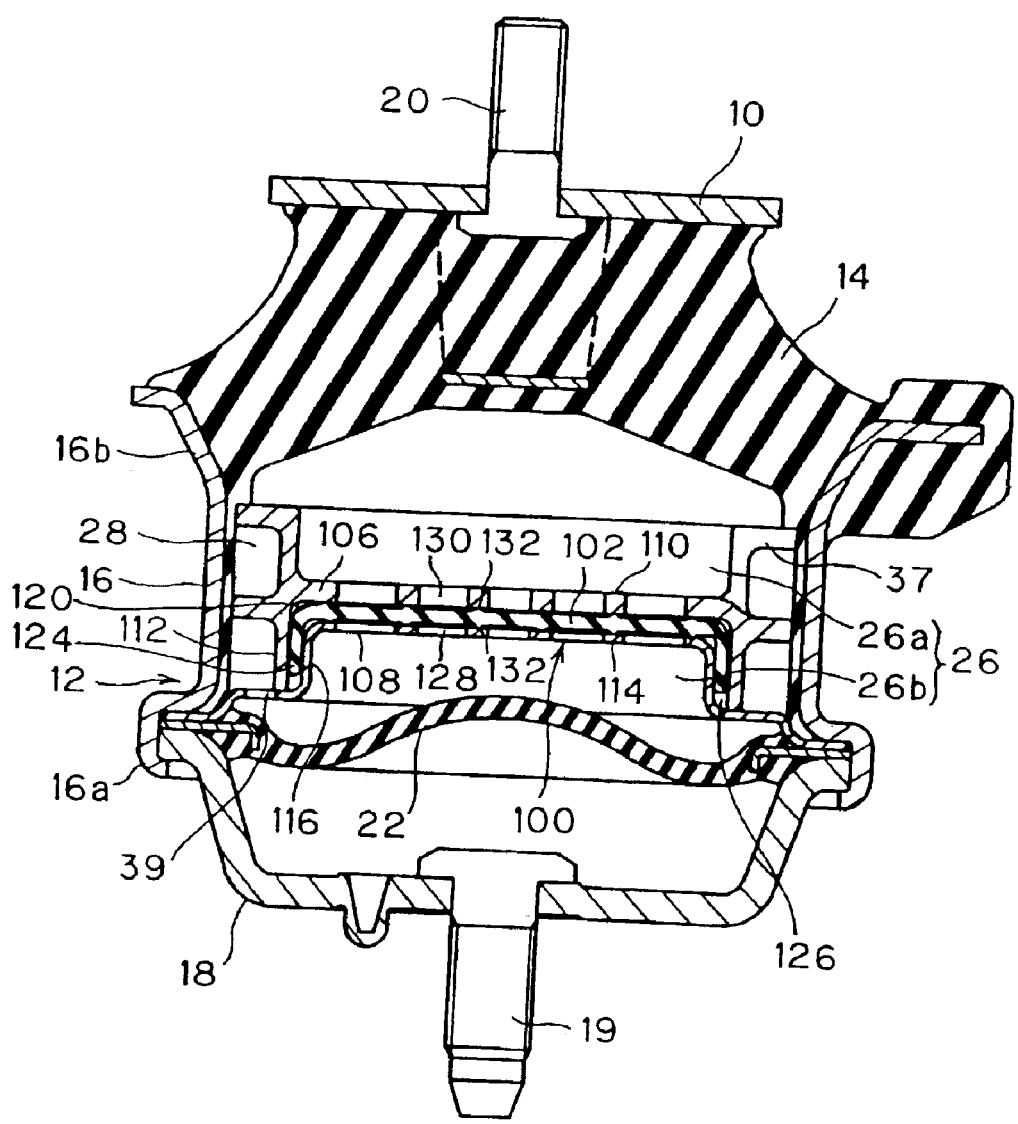
FIG. 6 is a longitudinal sectional view of an anti-vibration device according to a third example.
Figure 7:
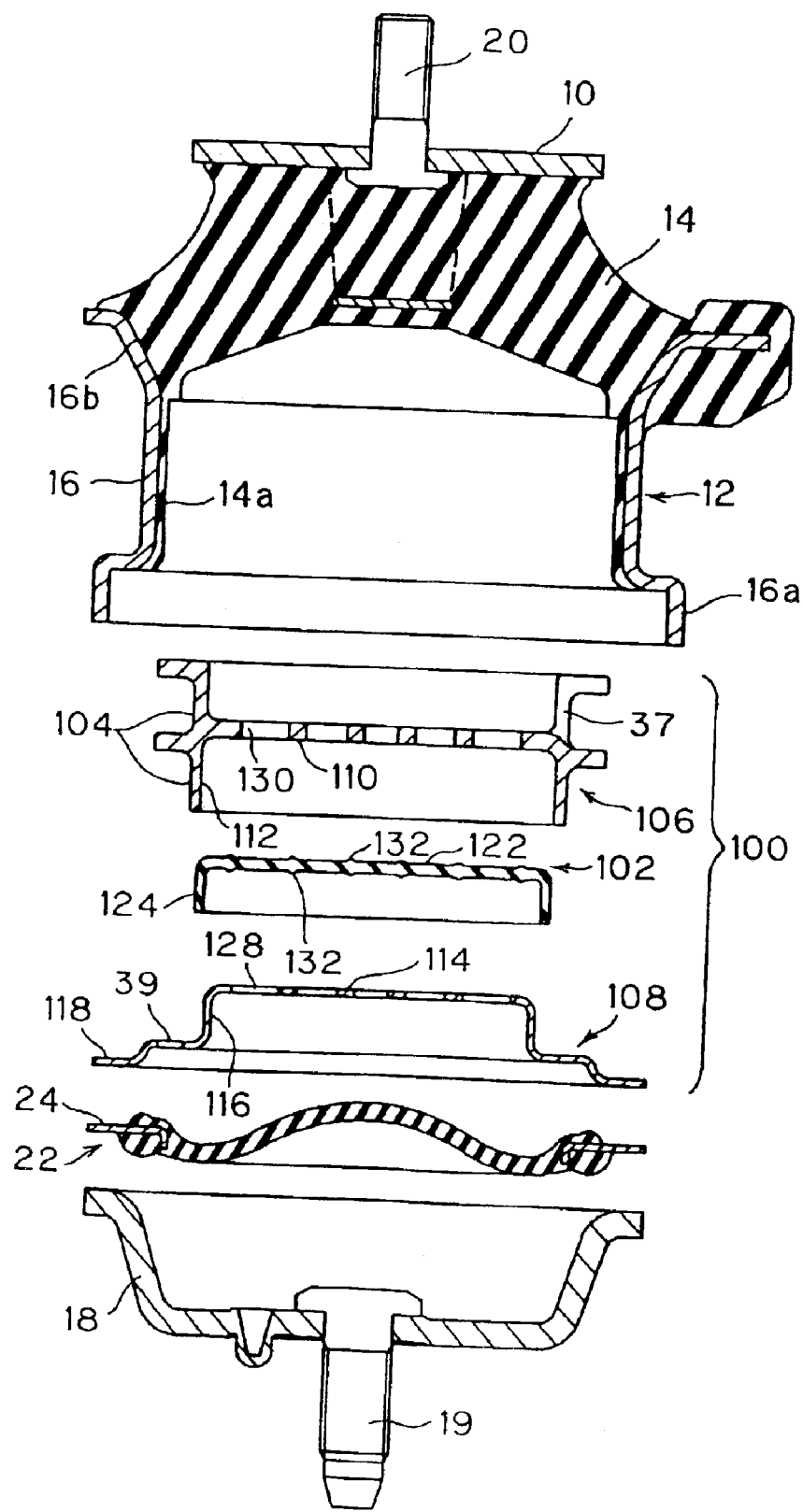
FIG. 7 is an exploded sectional view of the device in FIG. 6.
Figure 8:
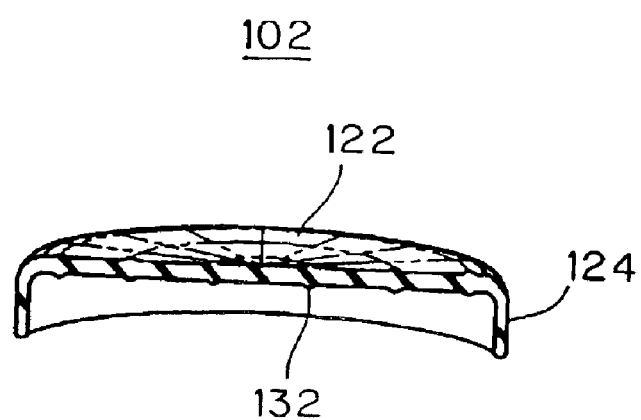
FIG. 8 is a perspective sectional view of a rubber membrane in the third example.

The rubber membrane 102 is, as illustrated in FIG. 8, configured in a sack shape, with its outer peripheral end bent downwardly. That is, the rubber membrane 102 comprises a disk-like main body 122 and a vertical wall section 124 extending downwardly from and integrally with its periphery. The vertical wall section 124 is inserted in a gap 126 delimited between the vertical wall 112 of the upper member 106 and the vertical wall 116 of the lower member 108, as shown in FIG. 6. The size of the gap 126 is configured to be somewhat larger, than the thickness of the vertical wall section 124 and clearances (plays) are ensured between the vertical wall section 124 and each of the vertical walls 112, 116 outside and inside it, thereby enabling the rubber membrane 102 to displace up and down. Further the axial length (height) of the vertical wall section 124 is configured so that its lower end may not abut on the outer peripheral portion 118 of the lower member 108.

Figure 9A:
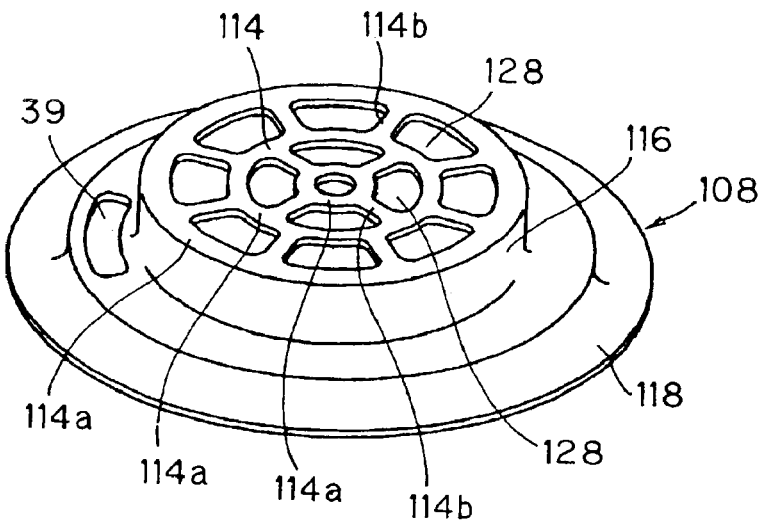
FIG. 9A is a perspective view of a lower member in that example, FIG. 9B a perspective view of a rubber membrane, and FIG. 9C a plan view of a combination of the lower member and the rubber membrane.
Figure 9B:
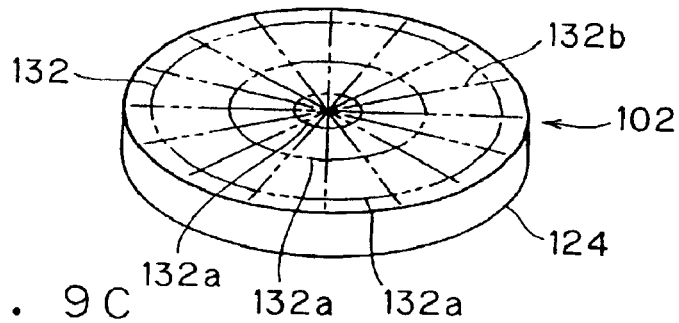
Figure 9C:
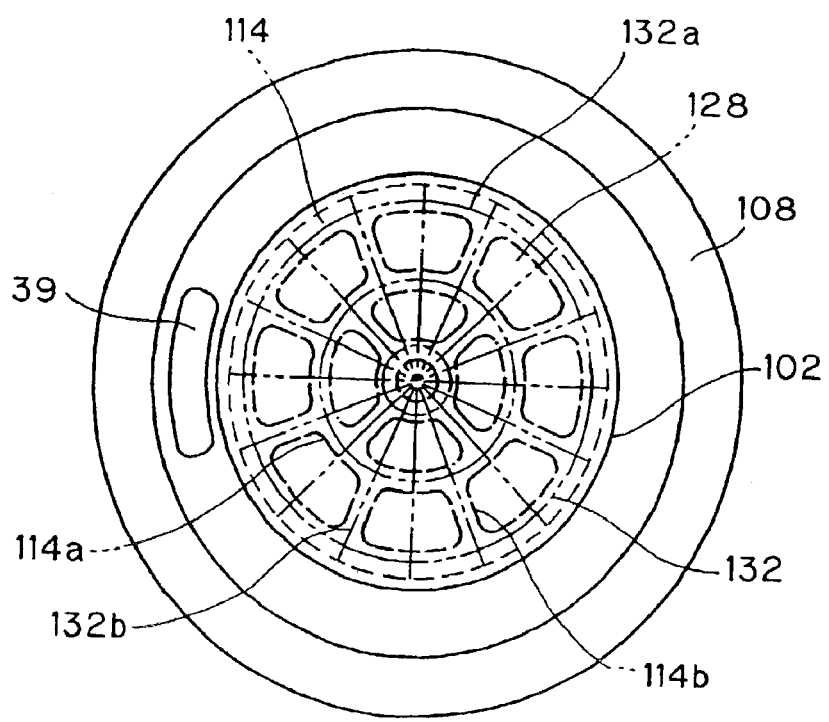

The grid 110 of the upper member 106 and the grid 114 of the lower member 108 have a same grid configuration. More particularly, the grid 114 of the lower member assumes, as shown in FIGS. 9A and 9C, the same configuration as in the first example, and accordingly, is constructed of a plurality of annular portions 114a and joint portions 114b thereby delimiting a plurality of through-holes 128. The grid 110 of the upper member 106 assuming the same configuration as the grid 114 is provided with through-holes 130 in the same configuration and arrangement as that of the through-holes 128 of the lower member 108. Both the upper member 106 and the lower member 108 constructed above are assembled together, with respective through-holes 130, 128 situated mutually in register.

The rubber membrane 102 is formed on its either surface integrally with projecting streaks 132 that abut on respective surfaces of the grids 110, 114 vis-a-vis either surface of the rubber membrane and surround outer peripheries of the through-holes 130, 128, thus extending around full circumferences of them. The configuration and the arrangement of the projecting streaks 132 is the same as in the first example as shown in FIG. 9B, and consequently, the projecting streaks 132 consist of a plurality of annular projecting pieces 132a and radial projecting pieces 132b.

By the anti-vibration device thus constructed in the third example, in addition to the effects achieved in the first example, it is possible to prevent the generation of the impinging sound of the rubber membrane 102 on the grids 110, 114 and noise, on account of the fact that the vertical wall section 124 provided at the periphery of the rubber membrane 102 precludes flapping of the periphery of the rubber membrane 102 due to a sudden hydraulic pressure change.

Further because of the provision of the vertical wall section 124, the rubber membrane 102 is easy to identify between its obverse side and reverse side. The rubber membrane 102 is superior also in workability when inserting the rubber membrane 102 into the vacant space inside the upper member 106. At that time the rubber membrane 102 is free from turning up at the peripheral part, so that assembling property of the partition member 100 is enhanced.

Otherwise with a view to positioning the rubber membrane 102 in the revolution direction, the lower end or tip of the vertical wall section 124 may be provided with a cutout or a convex portion so as to be fitted in a convex portion or a recess provided on the vertical wall 112 or 116 of the upper member 106 or the lower member 108. This can ensure the radial projecting pieces 132b provided on the rubber membrane 102 to rest on the joint portions of the grids 110, 114.

FOURTH EXAMPLE

Figure 10:
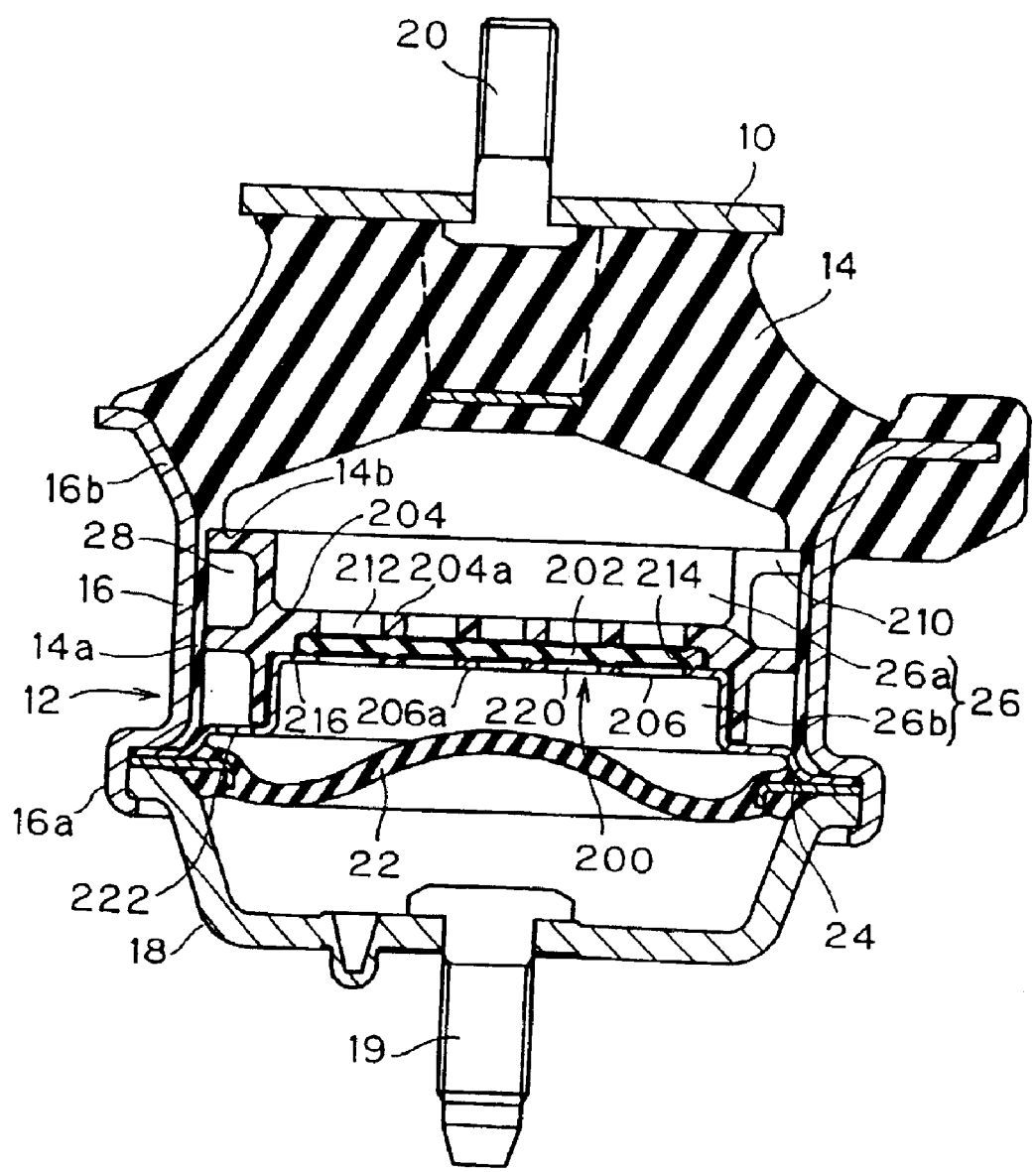
FIG. 10 is a longitudinal sectional view of an anti-vibration device pertaining to a fourth example.
Figure 11A:
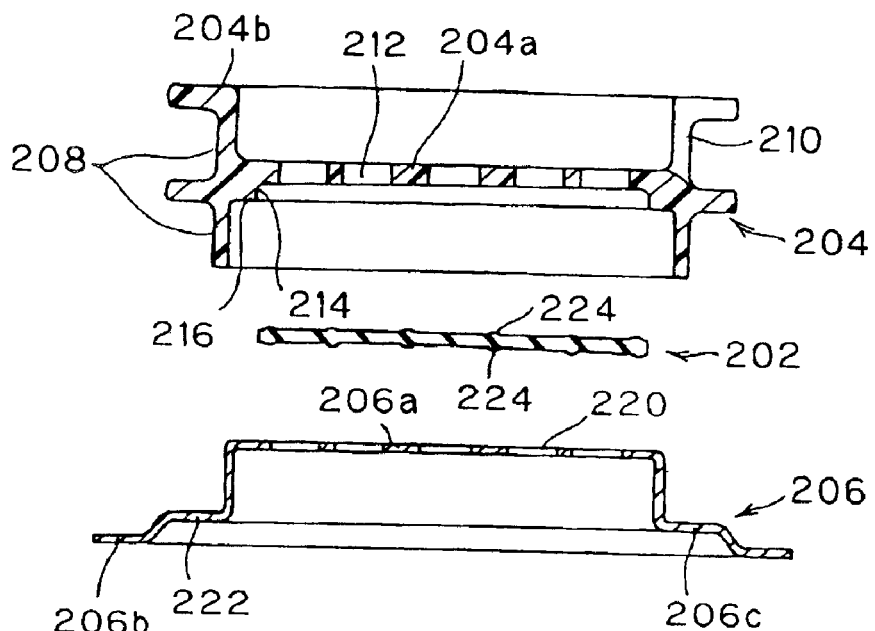
FIG. 11A is an exploded sectional view showing a partition member in the fourth example, FIG. 11B a sectional view of the partition member in an assembled state, and FIG. 11C an enlarged view of FIG. 11B in the circumscribing part V.
Figure 11B:
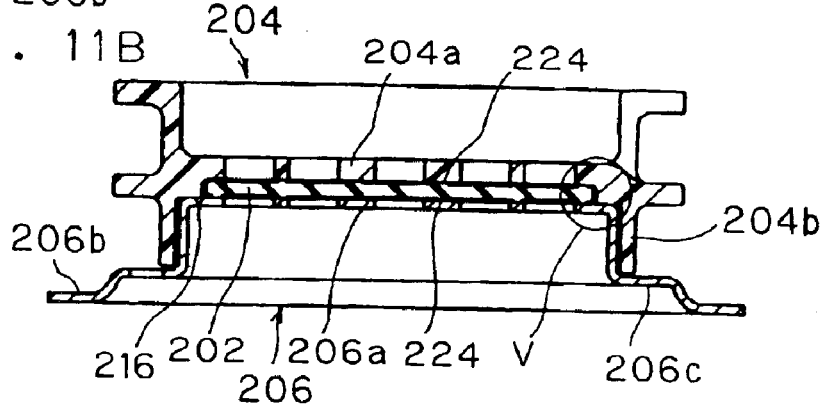
Figure 11C:
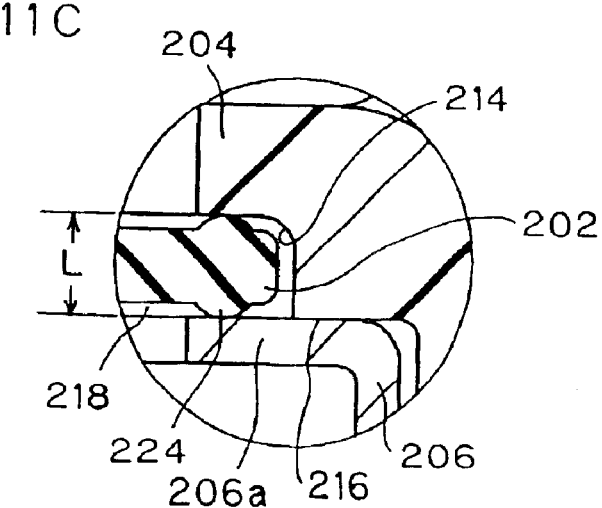
Figure 12A:
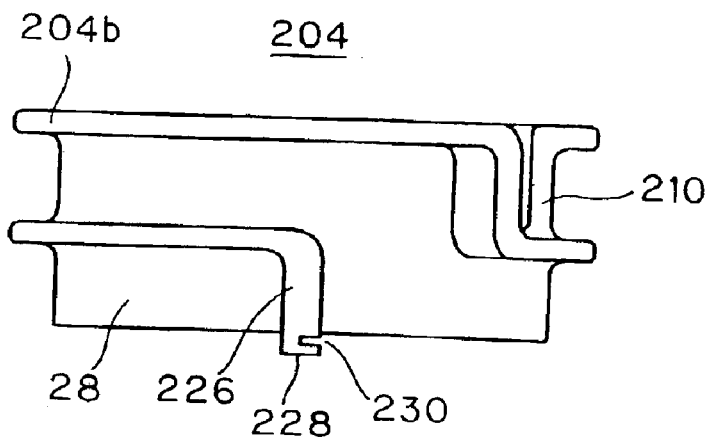
FIG. 12A is a side elevation of an upper member in the fourth example, FIG. 12B a side elevation of a partition member, and FIG. 12C an enlarged view of FIG. 12B in the circumscribing part W.
Figure 12B:
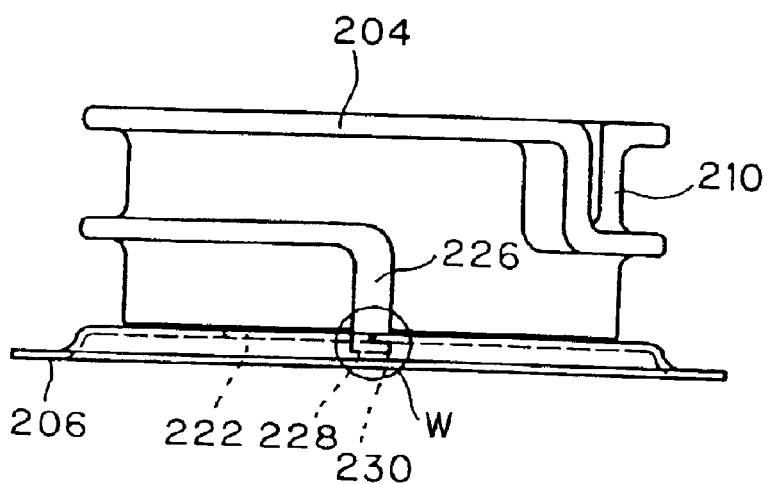

FIGS. 10 to 12 indicate a fourth example of this invention. The fourth example is different from the first example in construction of the partition member dividing the fluid-sealed chamber 26. The fourth example will be hereinafter described, but the description on similar elements designated by like reference numerals to the first example will be omitted unless otherwise stated, since these are regarded as being of the same construction.

In the fourth example, a partition 200 comparting the fluid-sealed chamber 26 comprises a disk-like rubber membrane 202 as a valve member partitioning the first chamber 26a and the second chamber 26b, an upper member (the first member) 204 disposed at the vibration-insulating base 14 side relative to the rubber membrane 202, and a lower member (the second member) 206 disposed at the diaphragm 22 side relative to the rubber membrane 202.

The upper member 204 is a molding product of resin (e.g. polyphthalamide), and includes, as illustrated in FIG. 11, a central shelf part (the first grid) 204a disposed vis-a-vis the upside of the rubber membrane 202 and limiting its upward displacement, and a peripheral part 204b having a groove 208 for forming the orifice channel 28. The peripheral part 204b is of a nearly cylindrical form and has, on its outer peripheral surface, the groove 208 extending circumferentially in vertically two cycles. Further the peripheral part 204b is defined with an opening 210 by being cut out partly from its upper wall, the opening 210 putting the orifice channel 28 and the first chamber 26a into communication with each other.

The central shelf part 204a of the upper member 204 is disposed to span the cylindrical peripheral part 204b in a manner dividing its interior relative to an axially central plane up and down, and accordingly, assumes a disk form. Although not illustrated, the central shelf part 204a is configured in the same grid form as in the first example, and has a plurality of through-holes 212 defined by this grid. The underside of the central shelf part 204a, namely the surface of it opposing the rubber membrane 202 is formed with a depressed part 214 for receiving therein the rubber membrane 202. Around the depressed part 214, a flat opening edge 216 assuming a ring form is ensured.

The lower member 206 is of a press molding product of metal sheet, and is composed of a disk-form central shelf part (the second grid) 206a disposed to oppose the underside of the rubber membrane 202 and limiting its downward displacement and a peripheral part 206b crimped and secured to the crimped area of the cylindrical fitting 16 and the bottom fitting 18. Between the central shelf part 206a and the peripheral part 206b, there is formed an intermediate step part 206c constituting the orifice channel 28 along with the peripheral part 204b of the upper member 204. By being crimped and secured at the peripheral part 206b, the lower member 206 will press the top end of the peripheral part 204b of the upper member 204 against a step portion 14b provided in the peripheral area of the underside of the vibration-insulating base 14.

The central shelf part 206a of the lower member 206 is provided to project upwardly from the intermediate step part 206c and disposed inside the lower side of the peripheral part 204b so as to oppose the central shelf part 204a of the upper member 204. The central shelf part 206a of the lower member 206 constitutes a flat plane element abutting on an edge surface 216 of an opening of the depressed part 214 of the upper member 204 so as to shut the opening of the depressed part 214, but has no depression for housing the rubber membrane 202, as is the case with the upper member 204. Instead, as shown in FIG. 11C, there is formed a clearance 218 limiting displacements of the rubber membrane 202 between the upper member 204 and the lower member 206, by pressing the central shelf part 206a of the lower member 206 onto the opening edge surface 216 in the depressed part 214 of the upper member 204 upon crimping and fixing stated above. The dimension L of the clearance 218 here is defined only by the depth of the depressed part 214.

As an aside, the central shelf part 206a of the lower member 206 is configured in a similar grid shape to that of the central shelf part 204a of the upper member 204, and has a plurality of through-holes 220 delimited by the grid. The intermediate step part 206c of the lower member 206 is provided with an opening 222 putting the orifice channel 28 and the second chamber 26b into communication with each other.

The rubber membrane 202 is situated within the clearance 218, and its vertical displacements are limited between the upper and lower central shelf parts 204a, 206a. The dimension L of the clearance 218 is set to be somewhat larger than the thickness of the rubber membrane 202, thereby enabling the rubber membrane 202 to displace up and down. On either surface of the rubber membrane 202 there are formed, as is the case with the first example, projecting streaks 224 integral with the either surface that abut on respective surfaces of the upper and lower central shelf parts 204a, 206a facing the either surface and surround the through-holes 212, 220 at their whole outer peripheries.

In the anti-vibration device of the fourth example thus constructed, the size of the clearance 218 housing therein the rubber membrane 202 is defined only by the depth of the depressed part 214 provided in the upper member 204. Therefore for the lower member 206 it is possible to ensure a rigidity withstanding the crimping strength by making it of metal whereas for the upper member 204 it is possible to ensure a dimensional precision of the movable clearance 218 without applying cutting processing by making it of resin.

With the fourth example of anti-vibration device, due the fact that the dimension of the movable clearance of the rubber membrane 202 is regulated only by the depth of the depressed part 214, both the upper and lower members 204, 206 are constructed so as to abut only on the opening end surface 216 of the depressed part 214 and the peripheral area of the central shelf part 206a, but so as not to come into contact with each other in other portions or areas than the above. Here, the positioning of the upper member 204 and the lower member 206 is carried out, as regards the radial direction, by the inner peripheral surface of the cylindrical fitting 16 and as regards the height direction, between the step portion 14b of the vibration-insulating base 14 and the crimped area.

As regards the revolution direction, its positioning can be carried out by elongating the lower end of the vertical wall 226 at the peripheral part 204b of the upper member 204 as shown in FIG. 12. The vertical wall 226 shuts off the flow in the circumferential direction at the lower end of the orifice channel 28 thereby serving to induce the fluid to the opening 222 of the lower member 206. The lower end of the vertical wall 226 is elongated downwardly of the underside of the peripheral portion 204b as an elongated portion 228, which is inserted into the opening 222 of the lower member 206 to abut on the one opening edge, whereby it is possible to peroform the positioning of the upper member 204 and the lower member 206 in the revolution direction and simultaneously ensure an open area of the opening 222.

Further because of the fact that the upper member 204 and the lower member 206 are brought into abutment only at the butt joining part between the opening end surface 216 of the depressed part 214 and the peripheral portion of the central shelf part 206a, as shown in FIG. 11B, there is ensured a clearance between the lower end of the peripheral part 204b of the upper member 204 and the intermediate step part 206c of the lower member 206. Due to this clearance it is conceivable that the fluid flowing through the orifice channel 28 can leak without being shut off completely by the vertical wall 226. However, because the lower end of the vertical wall 226 is elongated as described above, such leak can be avoided.

Figure 12C:
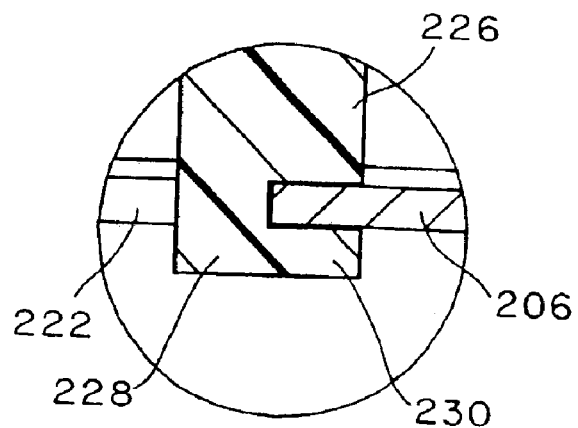

In addition, as shown in FIG. 12C, the elongated portion 228 of the vertical wall 226 may be provided with a hook 230, which can be caught in the opening edge of the opening 222 of the lower member 206. By this expedient, it is possible to prevent possible revolution and disengagement of the upper member 204 and the lower member 206 upon fabrication.

FIFTH EXAMPLE

Figure 13:
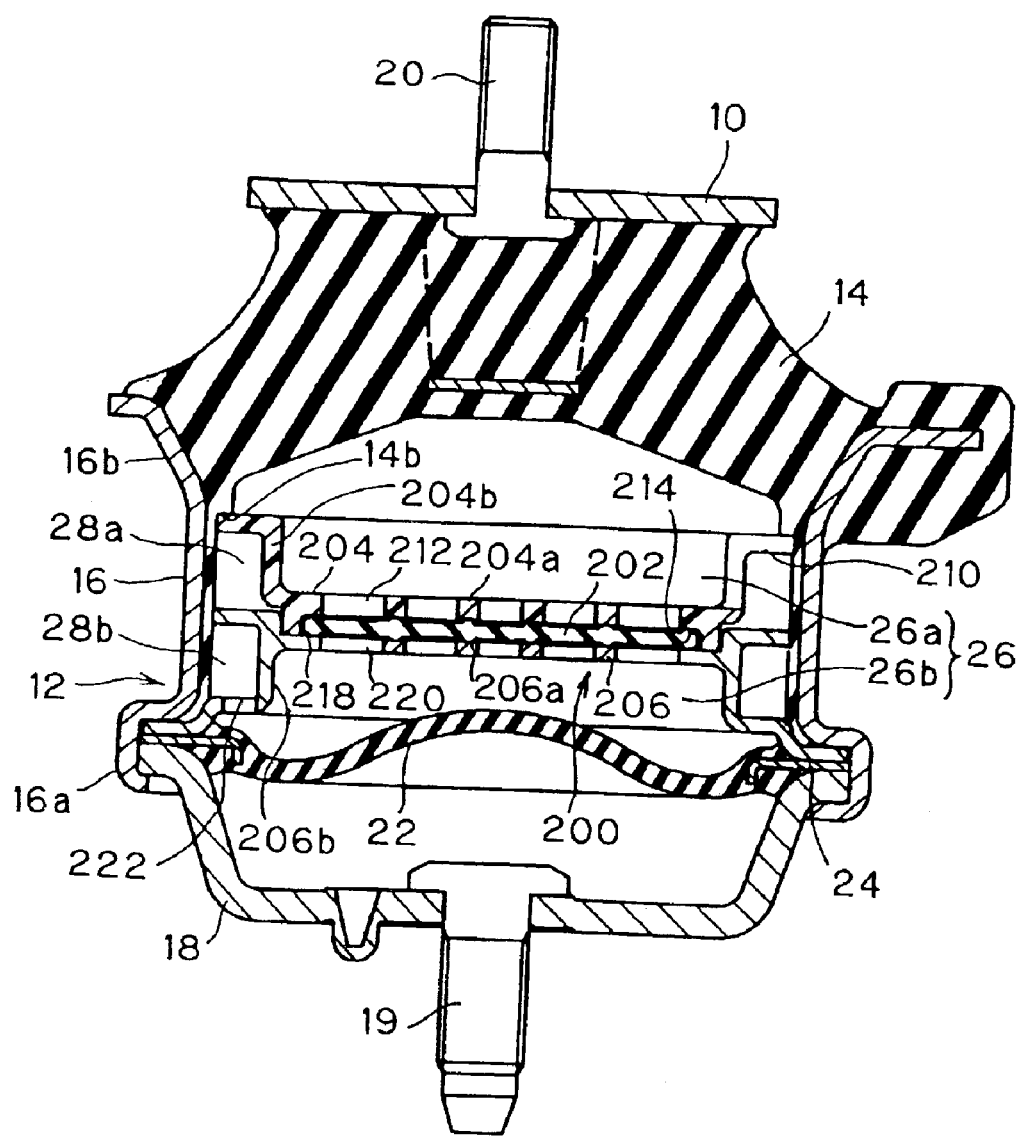
FIG. 13 is a sectional view of an anti-vibration device according to a fifth example.
Figure 14A:
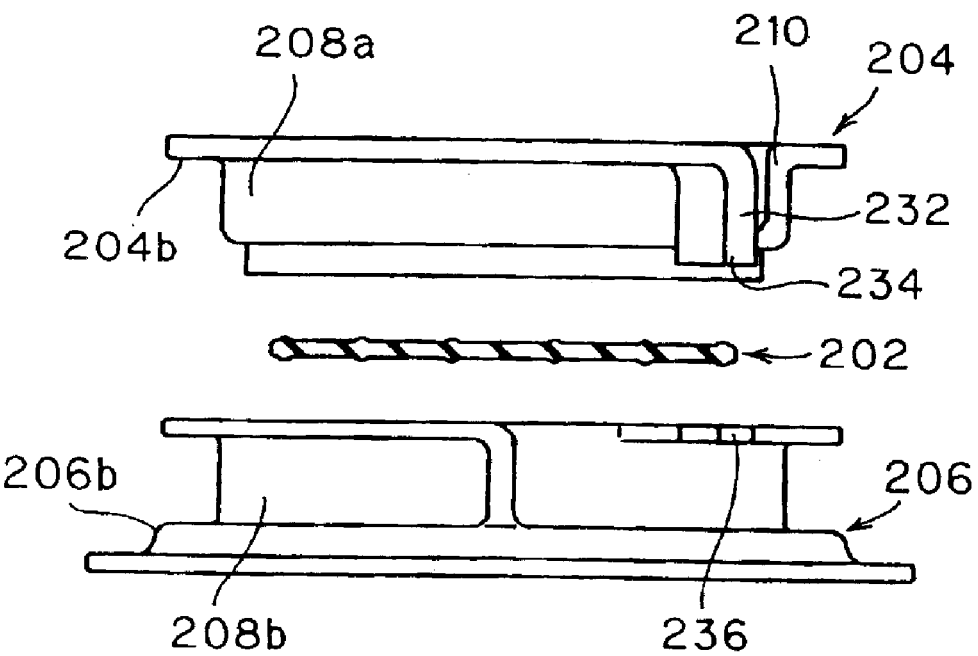
FIG. 14A is a side elevation of a partition member in the fifth example showing its exploded state, and FIG. 14B a side elevation of the partition member in its assembled state.
Figure 14B:
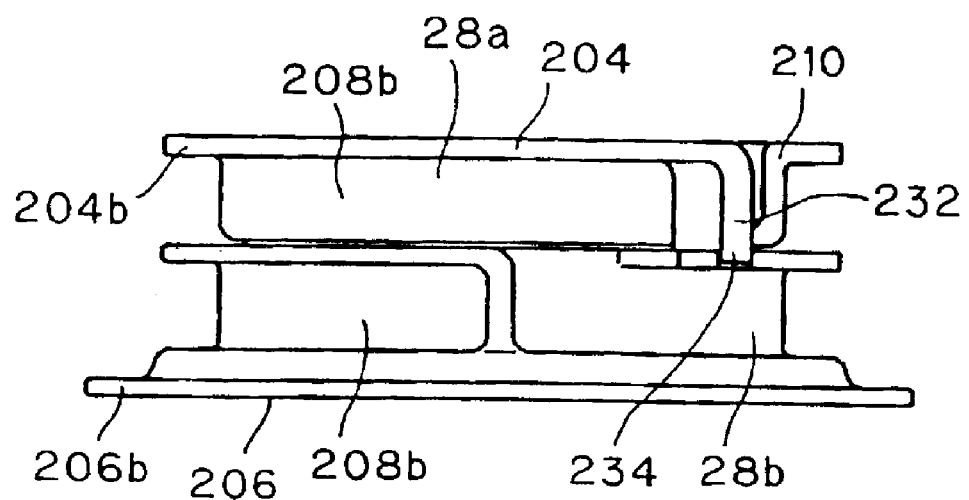

FIGS. 13 and 14 indicate a fifth example of this invention. In the fifth example, for the upper member 204 a resin is adopted likewise as in the fourth example, but for the lower member 206 an aluminum casting product is adopted, instead of the press steel sheet.

Moreover in the fifth example, the lower member 206 as well as the upper member 204 are provided at their peripheral areas with grooves 203b constituting the orifice channels 28. More particularly, the upper member 204 includes the central shelf part 204a and the peripheral part 204b having a groove 208a constituting an upper channel 28a of the vertical two-cycle orifice channel 28. On the other hand, the lower member 206 includes the central shelf part 206a, and the peripheral part 206b having a groove 208b constituting a lower channel 28b, wherein the upper wall of the peripheral part 206b assuming a U-form in section forms the upper channel 28a together with the peripheral part 204b of the upper member 204 whereas the lower wall of it is elongated outwards to be crimped and secured to the crimped area of the second attachment member 12.

Also in this fifth example the central shelf part 206a of the upper member 204 is provided with the depressed part 214, against which the flat central shelf part 206a of the lower member 106 is butted so as to obstruct the opening of the depressed part 214 whereby the clearance 218 limiting displacements of the rubber membrane 202 is formed between the upper member 204 and the lower member 206 and the size of the clearance 218 is defined only by the depth of the depressed part 214.

Here, for positioning purposes in the revolution direction of the upper member 204 and the lower member 206, the lower end of a vertical wall 232 provided on the upper member 204 is elongated as shown in FIG. 14. This vertical wall 232 is to induce the fluid from the upper channel 28a to the lower channel 28b. By elongating the vertical wall 232 in this way and inserting its elongated portion 234 into an opening 236 for positioning provided in the peripheral part 206b of the lower member 206, the upper member 204 and the lower member 206 are subjected to positioning in the revolution direction. Due to the positioning, leak of fluid in the clearance between the vertical wall 232 and the peripheral portion 206b of the lower member 206 is also prevented.

According to the fifth example, in addition to the effects obtained in the fourth example, a high degree of design freedom is obtainable because both the upper member 204 and the lower member 206 are of one molding product.

What is claimed is:

1. A fluid-sealed anti-vibration device, comprising:
   a first attachment member;
   a second attachment member;
   a vibration insulating base, made of a rubber material, connectingly interposed between the first and second attachment members;
   a diaphragm, on the second attachment member, opposite to the vibration-insulating base;
   a fluid-sealed chamber, disposed between the vibration-insulating base and the diaphragm;

a partition member, comprising an elastic membrane, having opposite surfaces, for partitioning the fluid sealed chamber into a first chamber at a vibration-insulating base side, and a second chamber at a diaphragm side;

an orifice channel in communication with the first chamber and the second chamber;

a pair of grids for limiting displacement of the elastic membrane; and a plurality of projections, arranged in a framework structure, between either surface of the elastic membrane and respective surfaces of the grids facing either surface, said projections surrounding through-holes delimited by the grids over an entire periphery of each through-hole, and regulating transfer of fluid among adjacent through-holes.

2. The fluid-sealed anti-vibration device as set forth in claim 1, wherein the projections are provided integrally with one of: either surface of the elastic membrane, and respective surfaces of the grids facing either surface.

3. The fluid-sealed anti-vibration device as set forth in claim 1, wherein said grids each substantially consist of a plurality of annular portions extending circumferentially and joint portions extending radially to couple the plurality of annular portions, thereby having two or more through-hole rows each consisting of a plurality of through-holes juxtaposed circumferentially, wherein said joint portions are arranged in different pitches between inner and outer circumferential sides of the grids;

said projecting streaks are provided on the elastic membrane and constructed of a plurality of annular projecting pieces extending circumferentially correspondingly to the annular portions of the grids and a plurality of radial projecting pieces extending radially correspondingly to the joint portions of the grids, the radial projecting pieces extending over approximately a whole radial length of the elastic membrane and radially at intervals of an equal angle.

4. The fluid-sealed anti-vibration device as set forth in claim 3, wherein the elastic membrane is provided with a positioning lug whereas one of the grids is provided with a positioning recess complimentary with the positioning lug, into which to receive said lug; both the elastic membrane and the grid are fitted together, whereby the elastic membrane in the revolution direction is positioned.

5. A fluid-sealed anti-vibration device comprising:

a first attachment member;

a second attachment member;

a vibration-insulating base, made of a rubber material connectingly interposed between the first and second attachment members;

a diaphragm, on the second attachment member opposite the vibration-insulating base;

a fluid-sealed chamber, disposed between the vibration-insulating base and the diaphragm;

a partition member, comprising an elastic membrane, for partitioning the fluid-sealed chamber into a first chamber at a vibration-insulating base side, and a second chamber at a diaphragm side; a first member disposed at the vibration insulating base side relative to the elastic membrane; and a second member disposed at the diaphragm side relative to the elastic membrane and crimped at its peripheral area to the second attachment member to urge a peripheral portion of the first member to a peripheral portion of the vibration-insulating base at the fluid-sealed chamber side;

an orifice channel in communication with the first chamber and the second chamber;

such that one of the first member and the second member is provided with a depressed part for housing therein the elastic membrane, and the other member is provided with a flat planar part abutting on an edge surface of an opening of the depressed part so as to close the opening of the depressed part, thus forming a clearance limiting displacement of the elastic membrane between the first member and the second member;

the first member being provided at its outer periphery with a vertical wall for shutting off flow through the orifice channel in a circumferential direction; the vertical wall having at an end of the wall an elongated portion inserted in a hole in the second member, thereby enabling the positioning of the first member and the second member in a direction of revolution; and the second member hole being an opening for placing the orifice channel and the second chamber into communication with each other.

6. The fluid-sealed anti-vibration device as set forth in claim 5, wherein the first member and the second member are made of different materials.

7. The fluid-sealed anti-vibration device as set forth in claim 5, wherein the first member is formed with the depressed part and is made of resin; and the second member is formed with the flat planar part and is made of metal.

8. The fluid-sealed anti-vibration device as set forth in claim 5, wherein the elongated portion of the vertical wall is formed with a hook that engages an opening edge of the hole.

9. A fluid-sealed anti-vibration device comprising:

a first attachment member;

a second attachment member;

a vibration-insulating base, made of a rubber material connectingly interposed between the first and second attachment members;

a diaphragm, on the second attachment member opposite the vibration-insulating base;

a fluid-sealed chamber, disposed between the vibration-insulating base and the diaphragm;

a partition member, comprising an elastic membrane, for partitioning the fluid-sealed chamber into a first chamber at a vibration-insulating base side, and a second chamber at a diaphragm side; a first member disposed at the vibration insulating base side relative to the elastic membrane; and a second member disposed at the diaphragm side relative to the elastic membrane and crimped at its peripheral area to the second attachment member to urge a peripheral portion of the first member to a peripheral portion of the vibration-insulating base at the fluid-sealed chamber side;

an orifice channel in communication with the first chamber and the second chamber;

one of the first member and the second member being provided with a depressed part for housing therein the elastic membrane and the other member being provided with a flat planar part abutting on an edge surface of an opening of the depressed part for closing the opening of the depressed part so that a clearance limiting displacement of the elastic membrane is formed between the first member and the second member; wherein:

the first member includes a first grid opposite to one surface of the elastic membrane, limiting displacement of the elastic membrane;

the second member includes a second grid opposite to the other surface of the elastic membrane, limiting displacement of the elastic membrane; and a plurality of projections, arranged in a framework structure, are provided between either surface of the elastic membrane and surfaces of the first and second grids opposing respective surfaces of the elastic membrane, such that the projections surround through-holes defined by the grids over an entire periphery of each through-hole, and regulate transfer of fluid among adjacent through-holes.

10. The fluid-sealed anti-vibration device as set forth in claim 1, wherein said projecting streaks constitute a web structure.

11. The fluid-sealed anti-vibration device as set forth in claim 1, wherein:

the partition member comprises the elastic membrane partitioning the first chamber and the second chamber;

a first member is disposed at a vibration-insulating base side relative to the elastic membrane; and a second member is disposed at a diaphragm side relative to the elastic membrane, and is crimped around a periphery thereof to the second attachment member, to urge a peripheral portion of the first member to a peripheral portion of the vibration-insulating base at a fluid-sealed chamber side;

such that one of the first member and the second member is provided with a depressed part for housing therein the elastic membrane and the other member is provided with a flat planar part abutting an edge surface of an opening of the depressed part, so as to close the opening of the depressed part, thus forming a clearance-limiting displacement of the elastic membrane between the first member and the second member.

12. The fluid-sealed anti-vibration device as set forth in claim 11, wherein the first member and the second member are made of different materials.

13. The fluid-sealed anti-vibration device as set forth in claim 12, wherein the first member is formed with the depressed part and is made of resin; and the second member is formed with the flat planar part and is made of metal.

14. The fluid-sealed anti-vibration device as set forth in claim 11, wherein the first member is provided at its outer periphery with a vertical wall for shutting off flow through the orifice channel in a circumferential direction; the vertical wall having at an end thereof an elongated portion inserted in a hole in the second member, for enabling the positioning of the first member and the second member in a direction of revolution.

15. The fluid-sealed anti-vibration device as set forth in claim 14, wherein the elongated portion of the vertical wall is formed with a hook that engages an opening edge of the hole.

* * * * *